United States Patent [19]

Taimatu et al.

[11] Patent Number: 5,800,152
[45] Date of Patent: Sep. 1, 1998

[54] OXIDATION RESISTANT METALLIC MATERIALS

[75] Inventors: Hitoshi Taimatu, Akita; Masami Ueda, Suita, both of Japan

[73] Assignee: Sumitomo Special Metals Company, Limited, Osaka, Japan

[21] Appl. No.: 737,993

[22] PCT Filed: Apr. 3, 1996

[86] PCT No.: PCT/JP96/00914
§ 371 Date: Feb. 14, 1997
§ 102(e) Date: Feb. 14, 1997

[87] PCT Pub. No.: WO96/31634
PCT Pub. Date: Oct. 10, 1996

[30] Foreign Application Priority Data

Apr. 4, 1995 [JP] Japan .................. 7-104899

[51] Int. Cl.⁶ .................. C22C 38/22; C22C 30/00
[52] U.S. Cl. .................. 420/40; 420/583
[58] Field of Search .................. 420/40, 583

[56] References Cited

U.S. PATENT DOCUMENTS 2,553,330  5/1951  Post et al. .................. 420/40
5,154,885 10/1992  Czech et al. .................. 420/583

Primary Examiner—Deborah Yee
Attorney, Agent, or Firm—Watson Cole Grindle Watson, P.L.L.C.

[57] ABSTRACT

Metallic materials which possess suitable characteristics for serving as an intermediate layer between a thermal barrier coating and a matrix substrate, or as a separator for a solid oxide fuel cell, contain 15 to 40 wt % Cr, 5 to 15 wt % W, 0.01 to 1 wt % M (where M is one or more than two elements chosen from Y, Hf, Ce, La, Nd, and Dy), 0.001 to 0.01 wt % B and a balance of Fe. The average value of the coefficient of thermal expansion of the metallic material is in a range from more than $12.0 \times 10^{-6}$/K to less than $13.0 \times 10^{-6}$/K in a temperature range from room temperature to 1,000° C., and the value is close to that of stabilized zirconia. The metallic materials display excellent high temperature oxidation resistance.

4 Claims, 4 Drawing Sheets

OXIDATION RESISTANT METALLIC MATERIALS

FIELD OF THE INVENTION

The present invention relates directly to metallic materials whereof the coefficient of thermal expansion is approximated to that of stabilized zirconia. More specifically, the present invention, by forming an alloy comprising either of a Cr-W-M-Fe system or a Cr-W-M-B-Fe system, where M can be one or more than two elements of an alloy element group comprising of Y, Hf, Ce, La, Nd or Dy, relates to oxidation-resistant metallic materials exhibiting excellent oxidation resistance at elevated temperatures and having an equivalent coefficient of thermal expansion to that of stabilized zirconia. The oxidation-resistant metallic materials are appropriate for an intermediate layer between the matrix substrate and stabilized zirconia serving as a heat-resistant and corrosion-resistant coating and solid state electrolyte for the solid oxide fuel cell which has been developed as a third generation fuel cell.

BACKGROUND OF THE INVENTION

Recently, energy conservation and global environmental problems have been crucial issues. Accordingly, various high temperature operating plant equipment including a gas turbine used for power generation have a tendency to require higher temperature and higher pressure operation. Because of the current industrial demands as mentioned above, the damage and deterioration of metallic materials being operated under critical operational conditions have become to be a serious technical problem.

As a result, in the current type of gas turbines for both aircraft and land power generators, it is a commonly adapted practice to apply a corrosion-resistant coating to the high strength superalloys for rotor blades and stationary blades as well. However, the problems associated with damage and/or deterioration problems due to high temperature corrosion remain for such coatings.

The principle and basic structure of the coating will be briefly explained by taking the thermal barrier coating (TBC) as an example. FIG. 1 is a schematic diagram showing the temperature gradients being developed entirely through the TBC structure, where A represents a ceramic layer, B is an intermediate layer, C is an alloy, and Tg indicates the high temperature combustion gas temperature, while Ta refers to a cooling-air temperature and temperatures $T_1$, $T_2$, $T_3$, $T_4$, $T_5$, and $T_6$ indicate respective temperatures at surface or interface zone. FIG. 2 depicts a cross sectional view of TBC when applied to the combustion equipment.

The main function of TBC is to prevent a temperature raise in the surface areas of metallic components by coating a ceramic material having lower thermal conductivity onto metallic components exhibiting the temperature gradient, as seen in FIG. 1. Application of the TBC to the gas turbine system, particularly for combustion devices, has been done for more than 10 years. Recently, application of the TBC to the cooling blades has become a more frequent practice. According to the tests using actual blade, it was recognized that the TBC system exhibited a thermal barrier effect ranging in temperature from 50° to 100° C.

TBC normally comprises a ceramic fusion spray layer and an intermediate fusion spray layer, wherein the former consists mainly of $ZrO_2$ (a solid solution with a stabilizing component such as MgO, $Y_2O_3$, or CaO) having much lower thermal conductivity of 0.005~0.006 cal/cm.s.°C. than $Al_2O_3$ (0.04~0.08 cal/cm.s.°C.) or $TiO_2$ (0.01~0.02 cal/cm.s.°C.), while the latter intermediate layer comprises of a Ni-Al alloy, Ni-Cr alloy or M-Cr-Al-Y alloy (where M can be Fe, Ni, Co or the like) in order to relieve the thermal expansion difference between the alloy (base) material and thereof, and to enhance the corrosion resistance. Research has been conducted to form a multi-layer structure in which the intermediate layer is formed as a mixed layer of metal and ceramic materials, or to construct the layer having a completely gradient composition.

As a fuel cell is considered as a novel power generating system, there is a phosphoric acid fuel cell (PAFC) in which the phosphoric acid aqueous solution is used for an electrolyte, a molten carbonate fuel cell (MCFC) using lithium carbonate or kalium carbonate or the like as an electrolyte, and a solid oxide fuel cell (SOFC) using zirconia-system ceramics for an electrolyte. The basic energy conversion of any one of the aforementioned fuel cells is based on a direct electric energy conversion from the chemical energy involved in the cells through an electrochemical reaction. Each of such fuel cells exhibits respective characteristics.

The current issues relating to energy policy and the global environment suggest use of fuel cells as soon as possible. Such fuel cells serve as a dispersed power supply which can be installed close to demand locations or a power supply for the purpose of co-generation. A largely expected potential of fuel cells in terms of an amount of needs for dispersed type power supply has been recognized.

Taking the solid oxide fuel cell as an example, its principle and basic structure will be briefly described by referring to a perspective assembly view of the solid oxide fuel cell, as seen in FIG. 3.

As seen in FIG. 3, the solid oxide cell consists of a single cell 4 comprising of a fuel electrode (anode) 2 and an air electrode (cathode) 3; both of the electrodes are sandwiching both sides of an electrolyte plate 1 of an yttria-stabilized zirconia (YSZ). Moreover, a plurality of the single cells 4 is formed in a lamellar structure through a separator 5 in order to attain a practically usable power supply. To a passage space 6 formed between the separator 5 and the fuel electrode (anode) 2, $H_2$ and CO are supplied as fuel sources. Furthermore, air is supplied to another passage space 7 being formed between the separator 5 and the air electrode (cathode) 3.

Referring to FIG. 4 explaining the principle of power generation of the solid oxide fuel cell, since the main constituent of the town gas as a fuel is methane, it needs to be modified to a gas containing mainly hydrogen at the modifying device 8. Namely, with the modifying device 8, the town gas as a fuel source is modified to hydrogen and carbon monoxide under a reaction with water vapor and reaction heat which are produced through a cell reaction. A portion of the reaction product will be fed to a fuel electrode 2 as a methane.

At the fuel electrode 2, the thus modified hydrogen and carbon monoxide react with the oxygen ion which is introduced from the air electrode 3 through the electrolyte plate 1. At this moment, water and carbon dioxide are produced, and the co-generated electrons will be exhausted to an external circuit 9.

At the air electrode 3, an oxygen ion is generated by the co-generated electrons of the external circuit 9 and the oxygen obtained in the air. The oxygen ion is introduced to the fuel electrode 2 through the electrolyte plate 1.

By progressing reactions taking place at the fuel electrode 2 and the air electrode 3, a direct electric power will be supplied to a load of the external circuit 9, for example, an electric bulb.

The aforementioned reaction can be analogous to a application of a reverse reaction of the so-called electrolysis reaction of water through which hydrogen is generated on the first electrode surface and oxygen is formed on the second electrode surface if a pair of electrodes are inserted into an aqueous solution containing the electrolyte and a current is applied to this system.

A presence of the fusion spray layer made of a stabilized zirconia appears to be most important and governing the system in said thermal barrier coating (TBC) structure.

According to the developing plan of the high temperature gas turbine in the Moonlight Project (which is related to an energy-saving plan, being promoted by the Ministry of International Trade and Industry), the achievement has been set in such that (i) the inlet gas temperature is 1,773K and (ii) the total power generating efficiency is 55% by a so-called co-generation which can be achieved by a combining with the steam turbine driven by the heat exhausted from said high temperature gas turbine.

The current thermal power efficiency is about 40% generated by solely the steam turbine. If the efficiency can be improved by 10%, it is estimated that, in Japan, the fuel equivalent to approximately 3.1 billion dollars can be saved every year.

Although the nickel-based alloy has been utilized in order to achieve the aforementioned specific aim of the higher temperature operation and higher efficiency, the alloy has only about one year life if it is used in the gas turbine without any coating thereon. Hence the coating protection is definitely indispensable.

However, since there exists a large discrepancy of coefficients of thermal expansion between the stabilized zirconia (ca. $10\sim12\times10^{-6}/K$) and the Ni-based super alloy (ca. $18\sim20\times10^{-6}/K$), the fusion spray layer of the stabilized zirconia is susceptible to cracking. In order to solve this problem along with the expected better corrosion resistance, an intermediate layer made of Ni-Al alloy, Ni-Cr alloy, or M-Cr-Al-Y alloy (where M can be Fe, Ni, Co, or the like) is sprayed to relieve said differences in coefficients of thermal expansion. However, the coefficients of thermal expansion of theses alloys is in the order of $16\sim18\times10^{-6}/K$ which is still relatively higher; resulting in an insufficient result.

The separator is an another important component in the solid oxide fuel cell.

The fuel cell is normally formed as a lamellar structure of plates, as seen in FIG. 3, in order to reduce the internal resistance and to increase the effective electrode area per unit volume.

Since the coefficient of thermal expansion of the material for the separator 5 is preferred to be close to those of the air electrode 3, the fuel electrode 2 or said solid state electrolyte 1, better corrosion resistance and high conductivity are also required to materials for the separator 5, (La, alkaline earth metal)$CrO_3$ is commonly used for the material of the separator 5.

The basic function of said separator 5 is to separate individual single cells 4 when the single cells are stacked in a lamellar structure, to seal hydrogen gas $H_2$ and air as fuel sources, and to physically hold the electrolyte plate 1.

In order to hold the electrolyte plate 1, if the surface area of said electrolyte plate 1 is formed with larger than those of the fuel electrode 2 or the air electrode 3, the lamellar forming can be easily achieved with the separator 5, resulting in easily holding the electrolyte plate 1.

However, since the separator 5 is made of brittle ceramic materials as mentioned previously, there are still problems remaining such as a weak strength and poor formability.

As a material for the separator, several important parameters have to be met such as strong resistances against both oxidation and reduction and better electro-conductivity since the separator connects the air electrode operated in the high temperature oxidation environment and the fuel electrode operated in the high temperature reduction atmosphere.

Although several materials including $LaCr_{0.9}Mg_{0.1}O_3$, $CoCr_2O_4$ or Ni-Al alloy have been proposed as a material for the separator, there is a technical problem such as a poor bonding between these separator materials and fuel electrode or the solid state electrolyte.

There is no well-developed technology available to produce and refine the raw powder with uniform particle distribution for fabricating said (La, alkaline earth metal)$CrO_3$. Furthermore, although the heat resisting alloys such as stainless steels or Inconel have a superior mechanical strength to the aforementioned ceramic materials, the solid state electrolyte will be subjected to a tensile stress at a cell operating temperature (which is about 1,000° C.) due to its relative large coefficient of thermal expansion. Moreover, the above-mentioned alloys possess another problem associated with a large electric resistance caused by the oxide film formed on its surface.

As to the metallic separator, there are two major problems; one is a thermal mismatch with regard to the differences in coefficients of thermal expansion and the other is a thickening of oxide film formed on these heat resistant steels. Regarding the problem associated with the coefficient of thermal expansion, there are several trials done; for example, (i) using a foam foam structure of the LaMnOx as a connector, (ii) approximating the coefficient of thermal expansion by controlling the alloy compositions, or (iii) spraying $LaCrO_3$ to prevent further growing of the surface oxide film. Unfortunately, these trails are not satisfactory.

Presently, because of excellent characteristics including the high strength and high toughness, high melting point and heat insulation, as well as some other electrical properties; the zirconia stabilized with various stabilizing components such as MgO, $Y_2O_3$, CaO or the like as its solid solution has been a main research/development objective to find better applications and the establishment of a production process with the appropriate selection of stabilizing components. Hence the stabilized zirconia has been utilized in versatile fields in industries including a steel industry, chemical industry, cells, fusion materials, turbines, internal combustion engine, sensors and others. In most of the applications, the stabilized zirconia is employed in a fashion that it is close to or adhered to metallic materials. However, a metallic material, which has an equivalent coefficient of thermal expansion to that of ceramic and hence can be used for different applications, has not been proposed yet.

OBJECTIVE OF THE INVENTION

After observing that, in the prior art, there is no metallic material proposed having an equivalent coefficient of thermal expansion to that of the stabilized zirconia and an excellent oxidation resistance; it is therefore an objective of the present invention to produce a metallic material having an excellent oxidation resistance, which has a suitable property for serving as an intermediate layer between said thermal barrier coating and the matrix substrate or as a separator material used in the solid oxide fuel cell. Moreover, said metallic material has a close value of the coefficient of thermal expansion to that of the stabilized zirconia.

SUMMARY OF THE INVENTION

After a continuous and diligent effort in developing metallic material having an excellent oxidation resistance and an equivalent coefficient of thermal expansion to that of the stabilized zirconia, it was found that an Fe-based alloy containing a certain amount of Cr, W and M (where M can be one or more than two elements chosen from a group comprising Y, Hf, Ce, La, Nd, or Dy) has a close value of coefficient of thermal expansion to that of the stabilized zirconia and exhibits an excellent high temperature oxidation resistance.

Moreover, it was also found that a grain boundary segregation of W element can be avoided by adding a small amount of B element to the Cr-W-M-Fe alloy.

As an alloy containing Cr, W and Fe, a ferritic steel or the like has been known as a stainless steel used as the gas turbine or boiler tubes (Japan Patent Publication No. Sho 57-45822, Japan Patent Publication No. Hei 3-59135, Japan Patent Publication No. Hei 3-65428, Japan Patent Publication No. Hei 4-54737, Japan Patent Publication No. Hei 5-5891, and Japan Patent Application Laid-Open No. Hei 2-290950).

However, all of these alloys disclosed in the aforementioned patent applications were developed only to enhance the high temperature strength. There was no consideration made in these applications on the coefficient of thermal expansion.

Furthermore, the alloy compositions of the aforementioned alloys (namely, Cr:7.0~15.0 wt %, W:0.05~3.5 wt %) are quite different from those proposed in the present invention.

Namely, according to the present invention, the oxidation resisting metallic material has the following composition; that is, Cr:15~40 wt %, W:5~15 wt %, one or more than two elements of Y, Hf, Ce, La, Nd or Dy:0.01~1 wt % or B:0.001~0.01 wt %, Fe: balance, along with unavoidable impurities. Moreover, the metallic material of the present invention exhibits an average coefficient of thermal expansion of more than $12\times10^{-6}$/K and less than $13\times10^{-6}$/K in a temperature range from the room temperature to 1,000° C.

The above and many other objectives, features and advantages of the present invention will be more fully understood from the ensuing detailed description of the preferred embodiment of the invention, which description should be read in conjunction with the accompanying drawings.

DETAILED DESCRIPTION OF THE PREFERRED EMBODIMENTS

Figure 1:
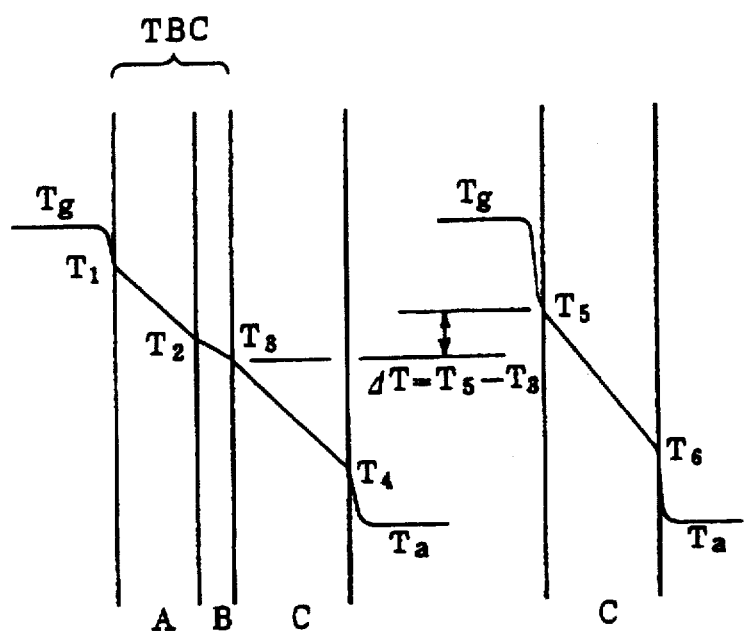
FIG. 1 is a schematic diagram showing a temperature gradient entirely cross over the thermal barrier coating (TBC) system.
Figure 2:
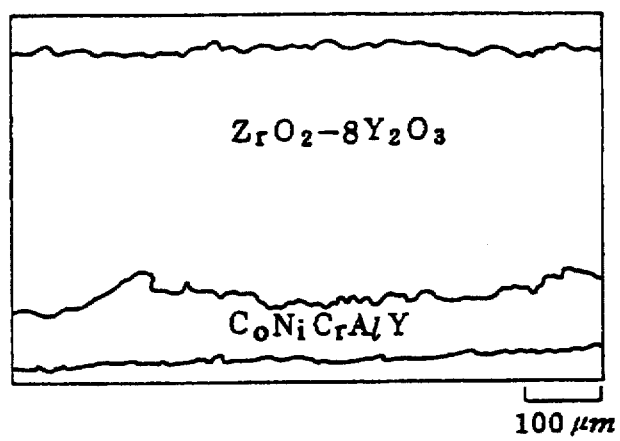
FIG. 2 is a microstructure depicting a cross sectional structure of the thermal barrier coating (TBC).
Figure 3:
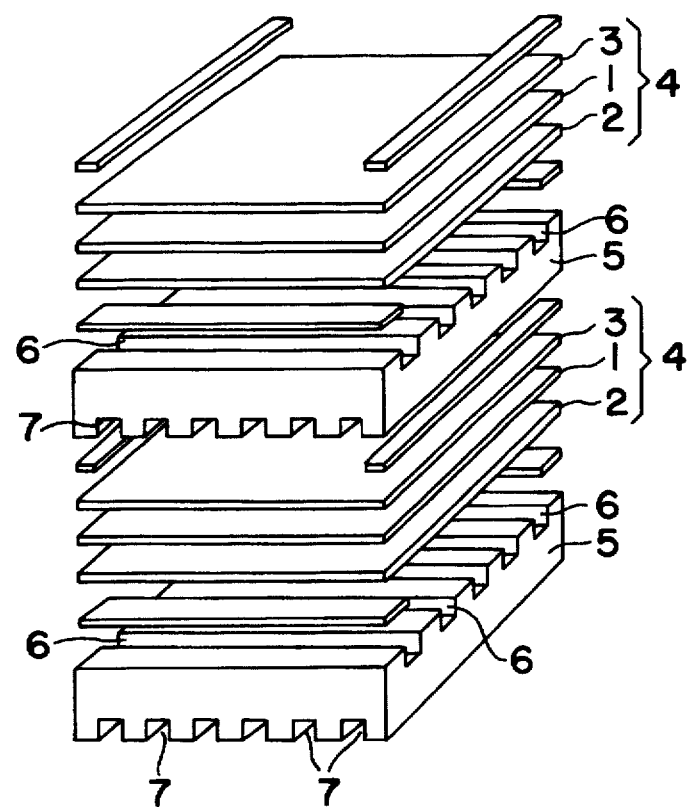
FIG. 3 is a perspective assembly view showing a structure of a solid oxide fuel cell.
Figure 4:
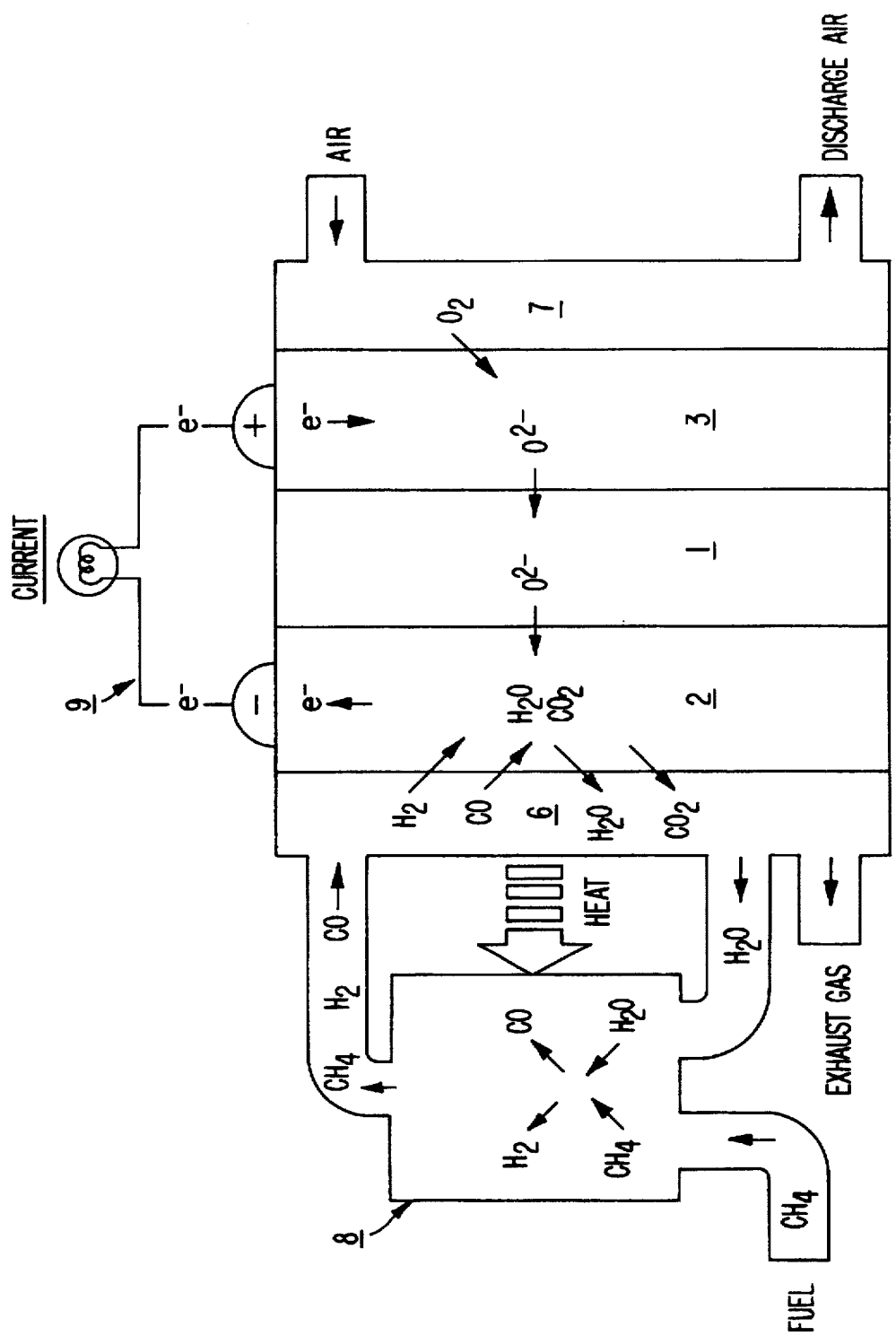
FIG. 4 shows an operational principle of a solid oxide fuel cell.

According to the present invention, Cr is a basic alloying element to exhibit a heat resistance and is needed to contain at least 15 wt %. However, if it contains more than 40 wt %, its beneficial effect will be saturated, rather it will cause the coefficient of thermal expansion increase and reduce the formability. Hence it should be in a range of 15 to 40 wt %, preferably it should be in a range of 15 to 25 wt %.

W is another basic alloying element to obtain a certain value of coefficient of thermal expansion; hence it should be included at least 5 wt %. However, if it exceeds more than 15 wt %, the coefficient of thermal expansion will increase. As a result, it should be in a range of 5 to 15 wt %. Preferably, it should be included in a range of 5 to 10 wt %.

Element group consisting of Y, Hf, Ce, La, Nd and Dy can enhance the oxidation resistance by either single element alloying or mixed element alloying. It is preferred to contain it at least 0.01 wt %. However, if it exceeds 1 wt %, the hot-formability will be rapidly deteriorated. Hence, it is preferable to contain it at a range of 0.01 to 1 wt %.

It is known that B element is an effective alloying element to prevent W element from the grain boundary segregation. Hence it is required to contain at least 0.001 wt %. However, if it contains more than 0.01 wt %, its beneficial effect will be saturated; therefore it is preferably to contain in a range of 0.001 to 0.01 wt %.

Fe serves a matrix element of the metallic material of the present invention and contains as a balance for this alloying system.

The metallic material of the present invention can be fabricated through a prior art casting technique. The thus-obtained ingot can be further subjected to hot- or cold-working or using the powder thereof to manufacture the final products which should be suitable for various purposes.

The mechanical properties and the heat-resistance of the metallic material of the present invention possess equivalent characteristics to those found in conventional types of stainless steels.

The value of the coefficient of thermal expansion of the metallic material of the present invention, because of an equivalent value to the coefficient of thermal expansion of the stabilized zirconia (i.e., $10~12\times10^{-6}$/K), is defined within a range from more than $12.0\times10^{-6}$/K to less than $13.0\times10^{-6}$/K in a temperature range from the room temperature to 1,000° C.

Since the presently invented metallic material has a close value of coefficient of thermal expansion to that of stabilized zirconia (i.e., $10~12\times10^{-6}$/K) and shows an excellent oxidation resistance, it can serve as an intermediate layer between the heat-resistant and corrosion resistant coating layer, or as a material for separator in a solid oxide fuel cell.

As a result, the metallic material according to the present invention exhibits a suitable characteristic in such a way when utilized along with the stabilized zirconia or with the material having a close value of coefficient of thermal expansion of that of said stabilized zirconia.

EMBODIMENT 1

The alloy having chemical compositions as listed in Table 1 was fabricated and the coefficient of thermal expansion at a temperature range from the room temperature to 1,000° C. and the weight gain due to the high temperature oxidation were measured. The results obtained through these measurements are listed in Table 2 along with the results obtained from the comparison materials.

From Table 2, it is observed that the value of coefficient of thermal expansion of the present metallic material showed a close value to that of the stabilized zirconia (that is, 10~12×10⁻⁶/K). Moreover, the excellent oxidation resistance of the presently invented metallic material is also recognized.

For evaluation of the oxidation resistance, the weight gain due to the high temperature oxidation by 1,000° C.×1,000 hours in air was obtained by subtracting the weight prior to oxidation tests, and the obtained weight difference (eventually weight gain) was divided by the total exposed surface areas.

Moreover, although samples No. 2, 4, 5, 6, 8 and 9 which do not contain B alloying element showed a slight evidence of grain boundary segregation of W element, no evidence of the grain boundary segregation of W was found with B-containing alloys No. 1, 3 and 7.

INDUSTRIAL APPLICABILITY

The metallic material comprising Cr-W-M-Fe or Cr-W-B-M-Fe alloy (where M can be one or more than two elements from a group consisting of Y, Hf, Ce, La, Nd and Dy) with a certain chemical compositions, according to the present invention, has a closer value of the coefficient of thermal expansion to that of the stabilized zirconia than that of the conventional stainless steel, and shows excellent high temperature oxidation resistance; so that it is most suitable to be used as an intermediate layer between the heat resistant coating layer made of the stabilized zirconia and corrosion resistant coating layer made of stabilized zirconia or as a separator for a solid oxide fuel cell in which the stabilized zirconia is employed as a solid state electrolyte.

While this invention has been described in detail with respect to preferred embodiment and examples, it should be understood that the invention is not limited to that precise embodiments; rather many modifications, and variations would present themselves to those of skill in the art without departing from the scope and spirit of this invention, as defined in the appended claims.

TABLE 1

| | Sample No. | Composition(Weight %, Balance Fe) | | | | | | | |
|---|---|---|---|---|---|---|---|---|---|
| | | Cr | W | Y | Hf | Ce | La | Nd | Dy | B |
| This Invention | 1 | 17.6 | 7.1 | — | 0.08 | — | — | — | — | 0.003 |
| | 2 | 17.8 | 9.8 | 0.95 | — | — | — | — | — | — |
| | 3 | 17.5 | 14.9 | — | — | — | 0.32 | — | — | 0.009 |
| | 4 | 18.0 | 5.2 | — | — | 0.155 | 0.065 | — | — | — |
| | 5 | 15.1 | 8.0 | — | — | — | — | 0.16 | — | — |
| | 6 | 20.0 | 6.8 | — | — | 0.008 | 0.002 | — | — | — |
| | 7 | 24.2 | 5.1 | — | — | — | — | 0.30 | 0.05 | 0.005 |
| | 8 | 34.5 | 7.4 | — | — | 0.018 | 0.005 | — | — | — |
| | 9 | 39.7 | 6.5 | — | — | — | — | — | 0.12 | — |
| Comparison | 10 | 17.3 | — | — | — | — | — | — | — | — |
| | 11 | 17.8 | 7.0 | — | — | — | — | — | — | 0.001 |
| | 12 | 5.1 | 6.8 | — | — | — | — | — | — | — |
| | 13 | 10.2 | 7.1 | — | — | — | — | — | — | — |
| | 14 | 44.8 | 7.2 | — | — | — | — | — | — | — |
| | 15 | 13.5 | 16.1 | — | — | — | 0.17 | — | — | — |

TABLE 2

| | Sample No. | Coefficient of Thermal Expansion (R.T. ~ 1000° C.) | Weight gain due to oxidation (mg/cm²) | Notes |
|---|---|---|---|---|
| This Invention | 1 | $12.1 \times 10^{-6}$/K | 1.3 | no grain boundary segregation of W |
| | 2 | $12.8 \times 10^{-6}$/K | 3.0 | |
| | 3 | $12.9 \times 10^{-6}$/K | 1.9 | no grain boundary segregation of W |
| | 4 | $12.4 \times 10^{-6}$/K | 0.8 | |
| | 5 | $12.2 \times 10^{-6}$/K | 2.5 | |
| | 6 | $12.4 \times 10^{-6}$/K | 1.1 | |
| | 7 | $12.7 \times 10^{-6}$/K | 2.3 | no grain boundary segregation of W |
| | 8 | $12.5 \times 10^{-6}$/K | 1.6 | |
| | 9 | $12.9 \times 10^{-6}$/K | 2.8 | |
| Comparison | 10 | $13.8 \times 10^{-6}$/K | 22.6 | AISI Type 430 |
| | 11 | $12.0 \times 10^{-6}$/K | 7.3 | |
| | 12 | $13.6 \times 10^{-6}$/K | 30.3 | |
| | 13 | $13.3 \times 10^{-6}$/K | 26.7 | |
| | 14 | $13.2 \times 10^{-6}$/K | 5.2 | |
| | 15 | $13.5 \times 10^{-6}$/K | 6.4 | |

We claim:

1. An oxidation resistant metallic material exhibiting an average coefficient of thermal expansion ranging from more than $12 \times 10^{-6}$/K to less than $13 \times 10^{-6}$/K in a temperature range from room temperature to 1,000° C., consisting essentially of 15 to 40 wt % Cr, 5 to 15 wt % W, 0.01 to 1 wt % of at least one element chosen from the group consisting of Y, Hf, Ce, La, Nd and Dy, balance Fe and unavoidable impurities.

2. An oxidation resistant metallic material exhibiting an average coefficient of thermal expansion ranging from more than $12\times10^{-6}$/K to less than $13\times10^{-6}$/K in a temperature range from room temperature to 1,000° C., consisting essentially of 15 to 40 wt % Cr, 5 to 15 wt % W, 0.001 to 0.01 wt % B, 0.1 to 1 wt % of at least one element chosen from the group consisting of Y, Hf, Ce, La, Nd and Dy, balance Fe and unavoidable impurities.

3. The metallic material according to claim 1, consisting of 15 to 40 wt % Cr, 5 to 15 wt % W, 0.01 to 1 wt % of at least one element chosen from the group consisting of Y, Hf, Ce, La, Nd and Dy, balance Fe and unavoidable impurities.

4. The metallic material according to claim 2, consisting of 15 to 40 wt % Cr, 5 to 15 wt % W, 0.1 to 1 wt % of at least one element chosen from the group consisting of Y, Hf, Ce, La, Nd and Dy, balance Fe and unavoidable impurities.

* * * * *